United States Patent
Smeyers

(10) Patent No.: US 10,455,143 B2
(45) Date of Patent: Oct. 22, 2019

(54) VEHICLE DISPLAY WITH VIEW CONTROL

(71) Applicant: Gentex Corporation, Zeeland, MI (US)

(72) Inventor: Marc A. Smeyers, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 239 days.

(21) Appl. No.: 15/072,630

(22) Filed: Mar. 17, 2016

(65) Prior Publication Data

US 2016/0277671 A1    Sep. 22, 2016

Related U.S. Application Data

(60) Provisional application No. 62/134,814, filed on Mar. 18, 2015.

(51) Int. Cl.
| | |
|---|---|
| *H04N 5/232* | (2006.01) |
| *B60R 1/00* | (2006.01) |
| *B60R 1/04* | (2006.01) |
| *H04N 5/225* | (2006.01) |
| *B60R 1/12* | (2006.01) |

(52) U.S. Cl.
CPC ........... *H04N 5/23216* (2013.01); *B60R 1/00* (2013.01); *B60R 1/04* (2013.01); *H04N 5/23293* (2013.01); *B60R 2001/1223* (2013.01); *B60R 2300/20* (2013.01); *B60R 2300/306* (2013.01); *B60R 2300/8066* (2013.01); *H04N 5/2259* (2013.01)

(58) Field of Classification Search
None
See application file for complete search history.

(56) References Cited

U.S. PATENT DOCUMENTS

| | | | | |
|---|---|---|---|---|
| 8,154,418 | B2* | 4/2012 | Peterson | B60R 1/12 340/425.5 |
| 2006/0164230 | A1* | 7/2006 | DeWind | B60K 35/00 340/461 |
| 2014/0285666 | A1* | 9/2014 | O'Connell | B60R 1/00 348/148 |
| 2014/0365120 | A1 | 12/2014 | Vulcano | |
| 2016/0082888 | A1* | 3/2016 | Kothari | B60R 1/00 348/148 |

FOREIGN PATENT DOCUMENTS

EP    2393691 B1    5/2014

OTHER PUBLICATIONS

International Search Report and Written Opinion of the International Searching Authority dated Jun. 23, 2016, for International Application No. PCT/US2016/023005, filed Mar. 18, 2016.

* cited by examiner

*Primary Examiner* — Heather R Jones
(74) *Attorney, Agent, or Firm* — Price Heneveld LLP; Bradley D. Johnson

(57) ABSTRACT

A display system for a vehicle is disclosed. The display system comprises a display device disposed in a passenger compartment of the vehicle. The display device comprises a screen and at least one sensor. The display system further comprises a controller in communication with the display device and an imager configured to capture image data in a field of view. The controller is operable adjust at least one of a position and a scale of a desired view of the image data for display on the screen in response to an input received by the at least one sensor.

9 Claims, 4 Drawing Sheets

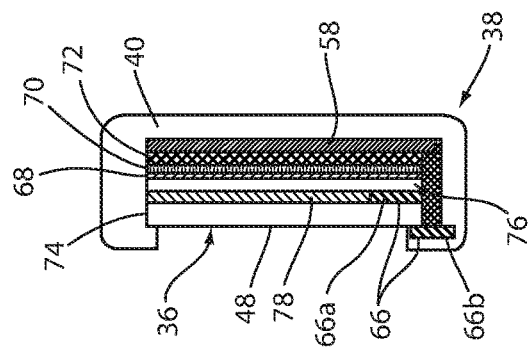
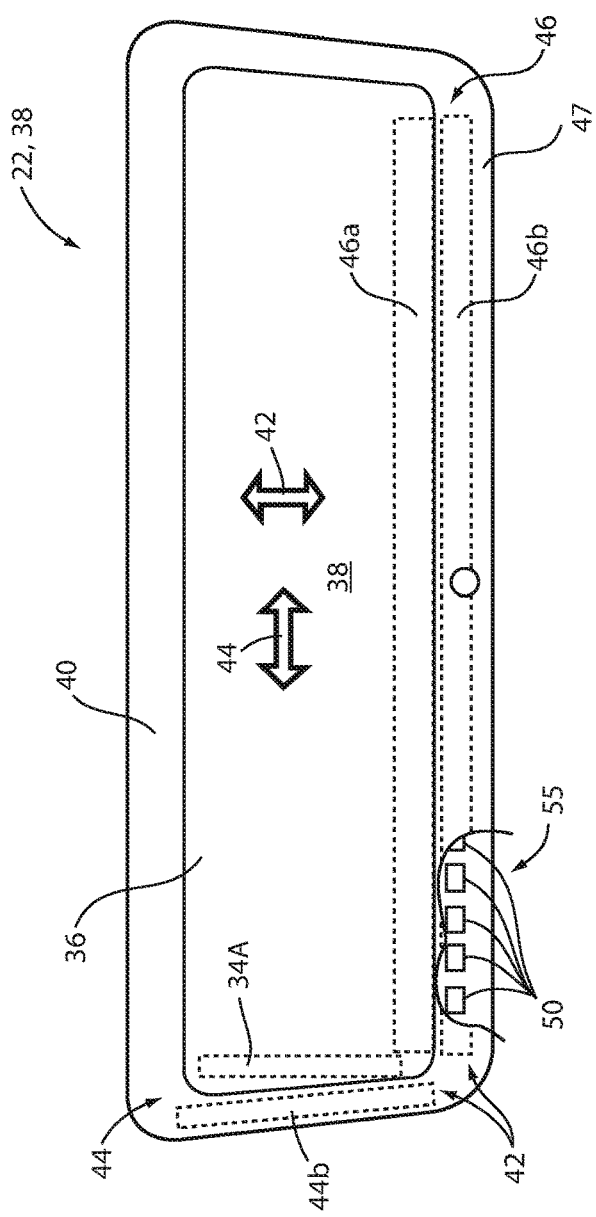

VEHICLE DISPLAY WITH VIEW CONTROL

CROSS-REFERENCE TO RELATED APPLICATION

This application claims priority to and the benefit under 35 U.S.C. § 119(e) of U.S. Provisional Patent Application No. 62/134,814, filed on Mar. 18, 2015, entitled "PROXIMITY CONTROL DEVICE FOR CAMERA," the entire disclosure of which is hereby incorporated herein by reference.

TECHNICAL FIELD

The present disclosure generally relates to a display system for a vehicle and more particularly to a display system providing a rearward view from the vehicle.

SUMMARY

According to one aspect of the present disclosure, a display system for a vehicle is disclosed. The display system comprises a display device disposed in a passenger compartment of the vehicle. The display device comprises a screen and at least one sensor. The display system further comprises a controller in communication with the display device and an imager configured to capture image data in a field of view. The controller is operable to adjust at least one of a position and a scale of a desired view of the image data for display on the screen in response to an input received by the at least one sensor.

According to another aspect of the present disclosure, a display apparatus for a vehicle is disclosed. The apparatus comprises a display device comprising a display screen disposed in a passenger compartment of the vehicle. The apparatus further comprises an array of sensors disposed proximate a front surface of the display device. A controller is in communication with the display device and an imager configured to capture image data in a field of view. The controller is operable adjust at least one of a position and a scale of a desired view of the image data for display on the screen in response to an input received by the array of sensors.

According to yet another aspect of the present disclosure, a display device for a vehicle is disclosed. The display device comprises a display screen coupled to a rearview display housing disposed in a passenger compartment of the vehicle. A first array of sensors is disposed proximate a front surface of the screen extending in a first direction. A second array of sensors is disposed proximate the front surface of the screen extending in a second direction. The display device comprises a controller in communication with the display screen and an imager configured to capture image data in a field of view. The controller is operable adjust at least one of a position and a scale of a desired view of the image data for display on the screen in response to an input received by at least one of the first array and the second array.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein:

FIG. 3A is a front view of a display device of a display system;

FIG. 3B is a side cross-sectional view of a display device of the display system in FIG. 3A.

DETAILED DESCRIPTION

Figure 1:
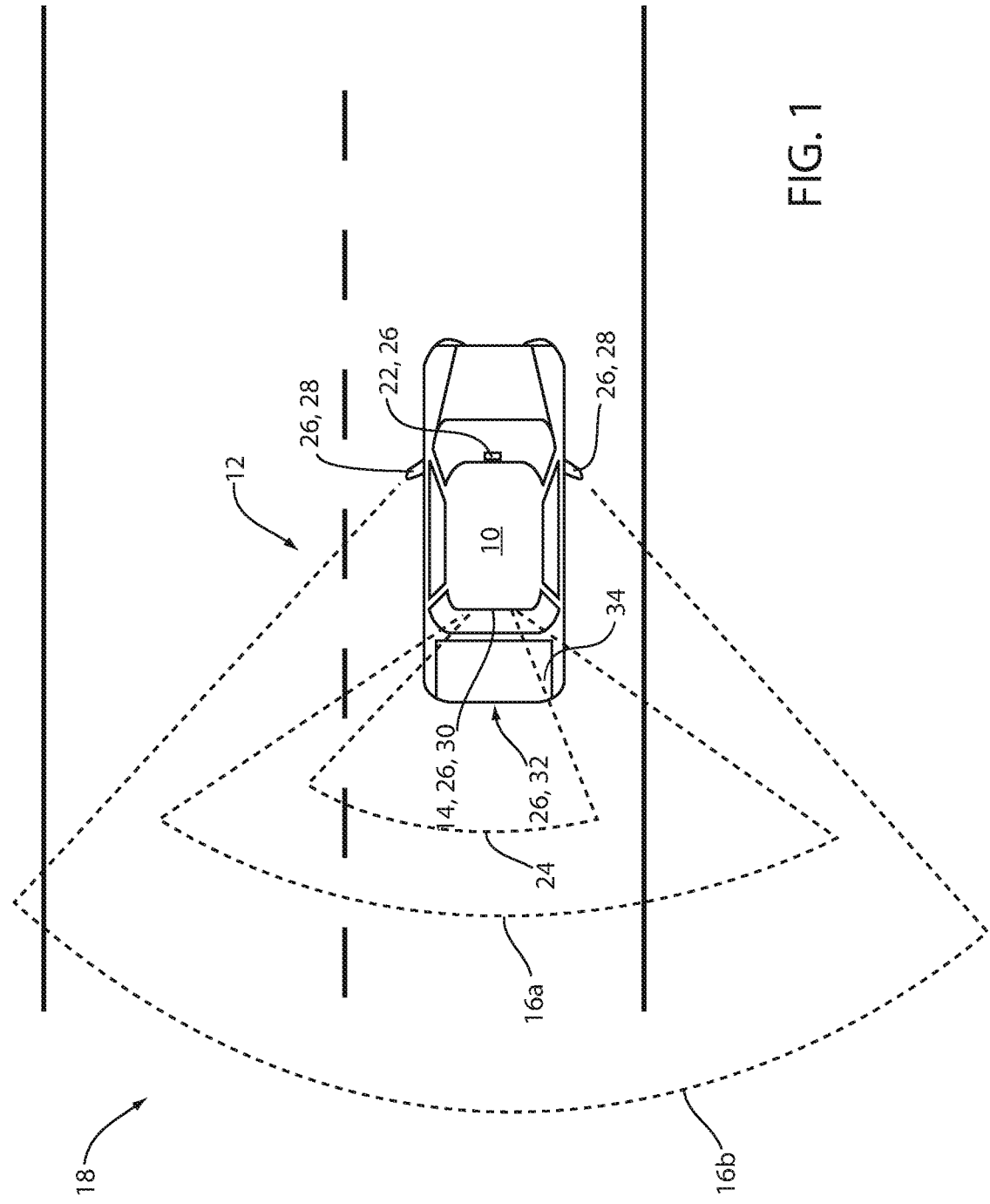
FIG. 1 is a diagram demonstrating a vehicle comprising a display system.

The present illustrated embodiments reside primarily in combinations of method steps and apparatus components related to an image sensor system and method thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Figure 2A:
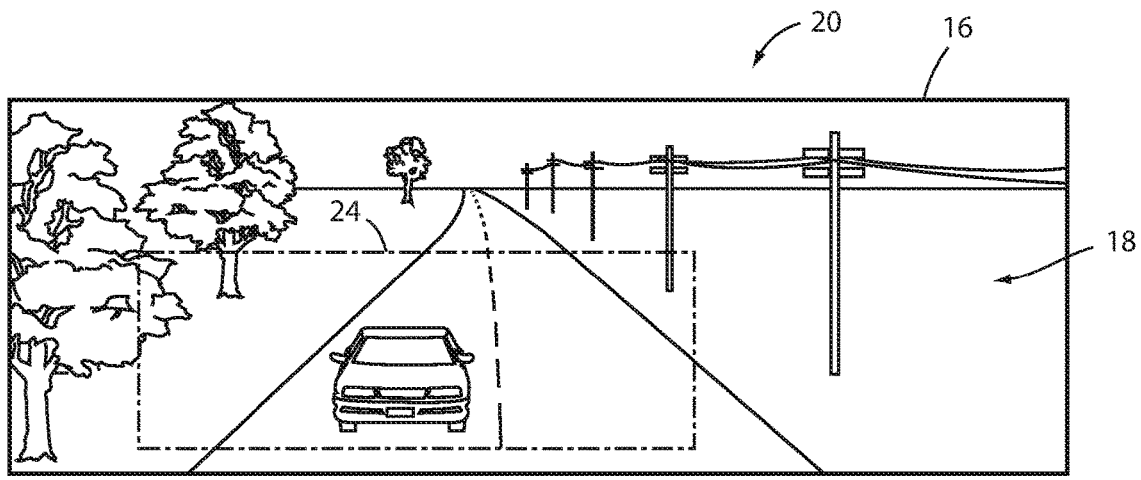
FIG. 2A is a diagram of image data corresponding to a scene captured by an imager of a display system.
Figure 2B:
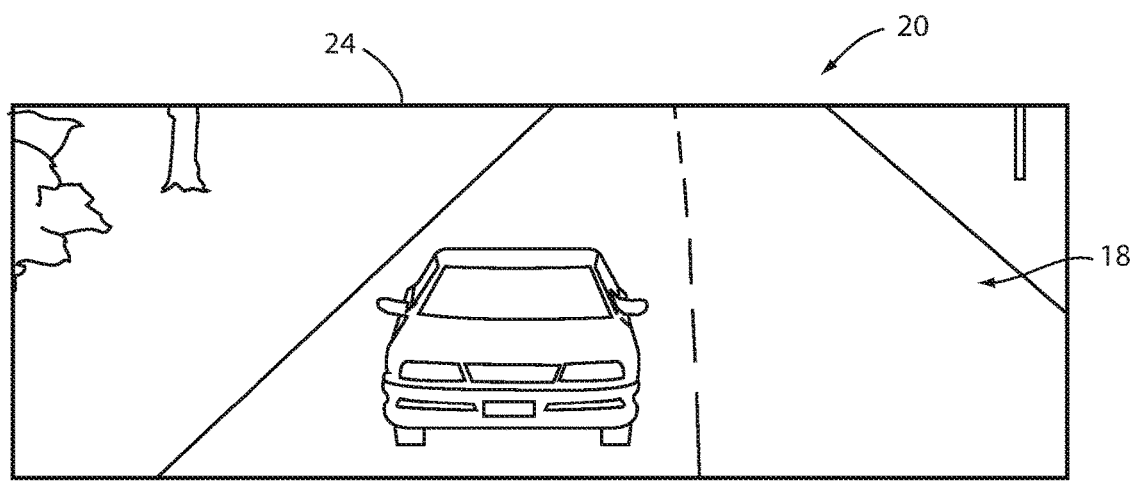
FIG. 2B is a diagram of image data corresponding to a portion of a scene captured by a imager shown in FIG. 2A.

Referring to FIGS. 1, 2A, and 2B, a vehicle 10 is shown equipped with a display system 12. The display system 12 comprises an imager 14 configured to capture a field of view 16a corresponding to a scene 18. The imager 14 is configured to capture image data 20 corresponding to the field of view 16a and display the image data 20 on a display device 22. The display device 22 is operable to adjust a desired view 24 of the image data 20 as it is displayed on a screen of the display device 22. Further detailed description of an exemplary embodiment of the display device 22 is discussed in reference to FIGS. 3A, 3B, and 4.

In some implementations, the display system 12 may be configured to capture an extended or composite field of view 16b. Image data corresponding to the extended field of view 16b may be captured by one or more additional imagers 26. The additional imagers 26 may be integrated or in connection with one or more of a side mirror 28, a rearview display device, proximate a rear windshield 30, a rear bumper 32, a rear deck-lid 34 (trunk), or various other portions of the vehicle 10. In such implementations, the desired view 24 may be adjusted to display a portion of the image data corresponding to the extended or composite field of view 16b.

The display device 22 may correspond to a rear view display device configured to provide a rearward directed view relative the vehicle 10. In this configuration, the display system 12 may be operable to display a series of images captured corresponding to scenes behind the vehicle 10. Scenes may include one or more objects, landscapes, road features, and any other visual information that may be captured by the imager 14. The imager 14 may be in communication with a controller and may comprise a pixel array configured to capture the image data 20 in the form of pixel information. In the various implementations discussed herein, the display system 12 may be configured to process the image data 20 captured by the imager 14 to display the desired view 24.

Referring now to FIGS. 2A and 2B, the field of view 16a and the desired view 24 of the image data 20 captured by the imager 14 are shown. FIG. 2A demonstrates the image data 20 captured corresponding to the field of view 16a. The desired view 24 may correspond to a portion of the image data displayed in FIG. 2A and is further shown in FIG. 2B. As discussed previously, the field of view 16a may correspond to the composite field of view 16b. Accordingly, the disclosure may provide for a flexible solution suited for a variety of applications.

As further discussed herein, the display system 12 may be configured to receive at least one input via a user interface. A controller of the display system 12 may process the at least one input to adjust a vertical position or horizontal position of the image data 20. Additionally, the controller may process the at least one input to adjust a scale of the image data displayed on a screen of the display device 22. The at least one input may correspond to a touch control configured to detect an object within a proximity of the display device 22 and identify at least one motion or gesture performed by the object. For example, the at least one input may be configured to detect a swipe of a single object and/or a pinch or separation of a plurality of objects proximate the screen of the display device 22. In this way, the display device 22 may be operable to receive at least one input to allow a user to define a position and scale of the desired view 24 within the field of view 16a.

Referring now to FIGS. 3A and 3B, a front view and a side cross-sectional view of the display device 22 are shown, respectively. The display device 22 may comprise a screen 36, which may be retained in a display assembly 38 by a bezel 40. A user interface 42 may be disposed proximate the bezel 40, the screen 36, or any location on the display device 22. For example the user interface 42 may comprise a first sensor 44 and a second sensor 46. The first sensor 44 and the second sensor 46 may correspond to directional controls, which may be disposed behind the bezel 40 or behind a display surface 48 of the display device 22. In some embodiments, the bezel 40 may extend around a perimeter of a front surface or the display surface 48 of the display device 22.

For example, a first proximity sensor 44a and a second proximity sensor 46a may be disposed behind the display surface 48. In some embodiments, a first proximity sensor 44b and a second proximity sensor 46b may be disposed behind an outer surface 47 of the bezel 40. In each of the configurations discussed herein, the first sensor 44 may correspond to an up/down input and the second sensor 46 may correspond to a left/right input. Each of the sensors may correspond to an array 50 of proximity sensors arranged along a portion of the display device 22. The proximity sensors may correspond to capacitive sensors in communication with the controller. However, it shall be appreciated by those skilled in the art that other types of proximity sensors can be used in addition to or in alternative to the capacitive sensors. Such sensors may include, but are not limited to, inductive sensors, optical sensors, resistive sensors, temperature sensors, the like, or any combination thereof.

The first proximity sensor 44a and the second proximity sensor 46a are shown positioned proximate a left side portion and a bottom portion of the display device 22, respectively. However, it shall be understood that the first proximity sensor 44a and the second proximity sensor 46a may be positioned proximate a right side portion and a top portion of the display device 22 as well as being located in any location behind the display surface 48. In some implementations, the display device 22 may correspond to a display that does not incorporate a bezel or a frameless display device. It shall further be understood that such embodiments may be implemented utilizing proximity sensors similar to the first proximity sensor 44a and the second proximity sensor 46a.

The array 50 of the proximity sensors may be arranged approximately in an up/down direction 52 and a left/right direction 54 relative the screen 36. The left/right direction 54 may correspond to approximately a direction from the driver side to the passenger side of the vehicle 10. Each of the directions 52 and 54 discussed herein may be adjusted relative to the display device 22, which may be mounted to a windshield of the vehicle 10 by an adjustable and/or pivotal mount. As such, the directions 52 and 54 are discussed herein in reference to the display device 22 arranged in a position aligned with the up/down and left/right directions of the vehicle 10 for clarity.

An exemplary embodiment of an array 50 of the proximity sensors is shown in reference to a cutout portion 55 of the bezel 40. In this example, the array 50 of the proximity sensors may correspond to a plurality of evenly spaced capacitive proximity sensors that are configured to output a proximity signal in the form of an electrical signal. The proximity signal may identify a proximity of an object 56, for example a digit of a user, proximate one or more of the individual sensors of the array 50. In this way, the controller may identify the motion of one or more objects in relation to the proximity sensors of the array 50 to identify a motion or a gesture of one or more objects.

The array 50 of proximity sensors may provide for various input controls in response to the object 56 being detect proximate the display device 22. Accordingly, one or more inputs or gestures proximate the front surface (e.g. the display surface 48) and/or in proximity to the bezel 40, the perimeter, sides of the display device, etc. may be communicated to the controller. In response to the one or more gestures and/or inputs, the controller may be configured to control various features of the display device 22. For example, the controller may provide for controls to scale, crop, and/or pan the image data 20 in the field of view 16 in response to an input. Additionally, the detection of the one or more gestures and/or inputs may be utilized by the controller to control one or more menus, display modes, and functions of the display device 22.

Referring now for FIG. 3B, a cross-sectional view of an exemplary embodiment of the display device 22 is shown. The controller may be disposed in the display assembly 38 corresponding to the display device 22. The controller may be mounted to or in communication with a printed circuit board (PCB) 58. The controller may be configured to control the screen 36, which may correspond to any form of display, for example a light emitting diode (LED) display, liquid crystal display (LCD), organic LED (OLED), etc. In the example utilizing the LCD display, the controller may be in communication with at least one sensing electrode 66, a transparent electrode 68, an LCD display 70, and a backlight 72.

The at least one sensing electrode 66 is shown disposed behind a first transparent substrate 74 and the bezel 40. In this configuration, the at least one sensing electrode 66 may be utilized in combination with the transparent electrode 68 to function as capacitive sensors corresponding to the second sensor 46. The sensing electrode 66 may be separated from the transparent electrode 68 by a second transparent substrate 76 in connection via an adhesive 78. The display device 22 may incorporate one or more of the sensing electrodes 66, which may correspond to the second proximity sensors 46*a* and 46*b* as illustrated in FIG. 3B. The first and second transparent substrates 74 and 76 may be of glass or another substantially light transmissive material. The sensing electrode 66 and the transparent electrode 68 may be formed of a transparent conductive material (e.g., indium tin oxide (ITO)), and a film formed by patterning the transparent conductive material on the second transparent substrate 76 to implement the proximity sensors 44 and 46 discussed herein.

As shown in FIG. 3B, the first sensing electrode 66*a* may correspond to the second proximity sensor 46*a* and the second sensing electrode 66*b* may correspond to the second proximity sensor 46*b*. As discussed previously, the proximity sensors 44*a*, 44*b*, 46*a*, and 46*b* may be incorporated in the display device 12 alone or in any combination. The outer surface of the first transparent substrate 74 may correspond to the display surface 48. Adjacent to the second transparent substrate 76, the LCD display 70 and the backlight 72 may be disposed, and may further be mounted to the PCB 58. In this configuration, the display device 22 may be operable to display the image data captured by the imager 14 on the screen 36 and detect the object 56 to control a position and/or scale of the image data within the field of view 16*a*.

In operation, a user may slide one or more digits, demonstrated as the object 56, along at least one of the proximity sensors 44 and/or 46. An up or down motion along the first proximity sensor 44 may result in the desired view 24 of the image data 20 shifting up or down in the field of view 16*a*. A left or right motion along the second proximity sensor 46 may result in the desired view 24 of the image data 20 shifting left or right in the field of view 16*a*. Additionally, moving two digits or objects from positions close in proximity to each other, to positions further away along one of the proximity sensors 44 or 46, or vice versa, may increase or decrease the scale of the image data to be displayed in the desired view 24. In this way, the display system 12 may be configured to receive at least one input utilizing the proximity sensors 44 and 46 to control a position and/or scale of the desired view 24 of the image data 20 displayed on the screen 36.

Figure 4:
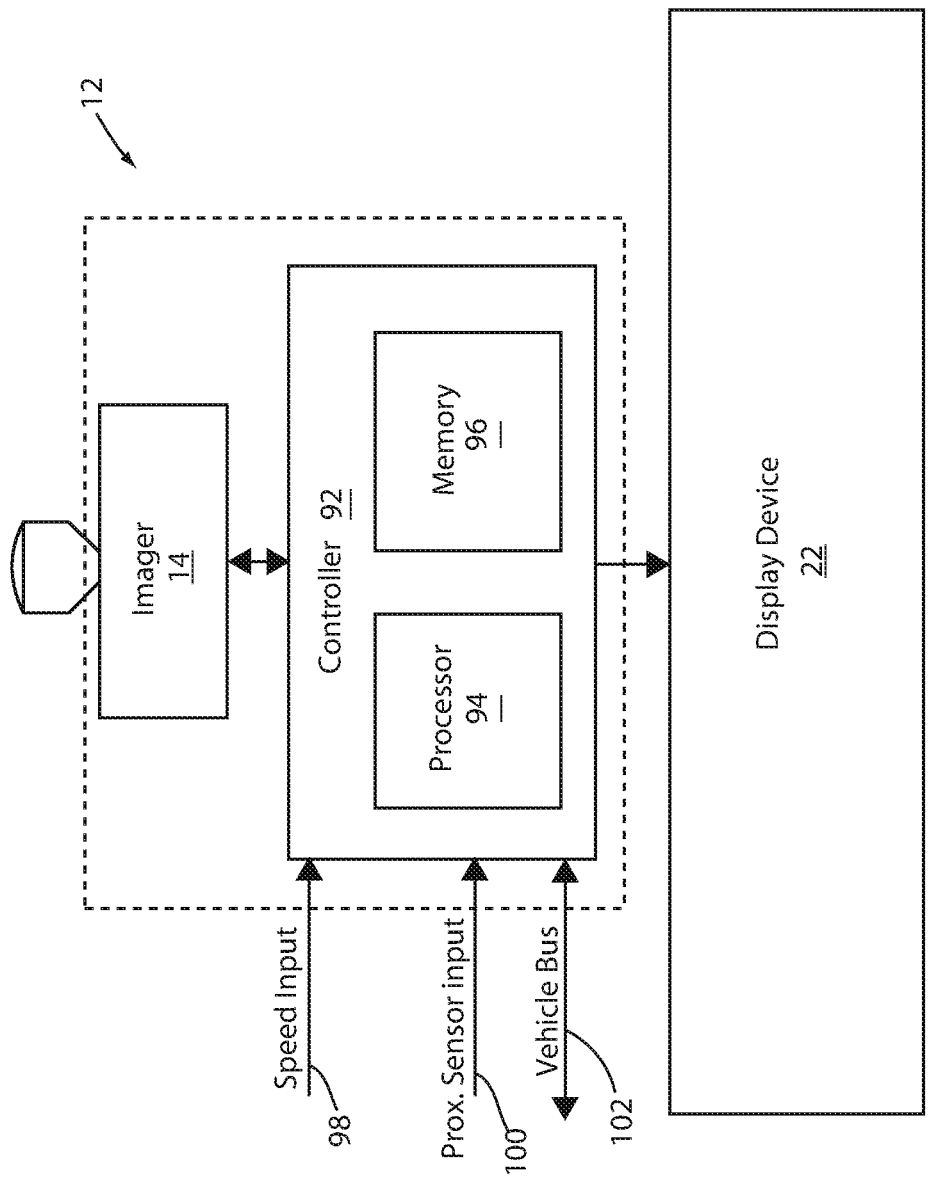
FIG. 4 is a block diagram of a display system in accordance with the disclosure.

Referring now to FIG. 4, a block diagram of the display system 12 is shown. The imager 14 is shown in communication with the controller 92. A pixel array of the imager 14 may correspond to a CMOS image sensor, for example a CMOS active-pixel sensor (APS) or a charge coupled device (CCD). Each of the pixels of the pixel array may correspond to a photo-sensor, an array of photo-sensors, or any grouping of sensors configured to capture light. The controller 92 may comprise a processor 94 operable to process the image data as supplied in analog or digital form from the imager 14. In various embodiments, the processor 94 may be implemented as a plurality of processors, a multicore processor, or any combination of processors, circuits, and peripheral processing devices.

The controller 92 may further comprise a memory 96. The memory 96 may comprise various forms of memory, for example, random access memory (RAM), dynamic RAM (DRAM), synchronous DRAM (SDRAM), and other forms of memory configured to store digital information. The memory 96 may be configured to store the image data 20 for processing. Processing the image data 20 may comprise scaling and cropping the image data 20 to adjust a position and apparent size of the image data 20 as it is output to the screen 36 of the display device 22. In some embodiments the memory 96 may further be configured to store a plurality of user profiles, each corresponding to a specific desired view that may be recalled in relation to a particular operator of the vehicle 10.

The controller 92 may further be in communication with a plurality of inputs for example, a speed input 98, a proximity sensor input 100, and a vehicle bus 102. The speed input 98 may provide a signal communicating a speed of the vehicle 10 via a speedometer or any device operable to measure and communicate data corresponding to the speed of a vehicle 10. The proximity sensor input 100 may be configured to receive signals from one or more of the proximity sensors 44 and 46 to adjust the desired view 24 of the image data within the field of view 16*a*. The vehicle bus 102 may be implemented using any suitable standard communication bus, such as a Controller Area Network (CAN) bus, a Local Interconnect Network (LIN) bus, etc. The vehicle bus 102 may be configured to provide a variety of additional information to the controller 92. Such information may correspond to one or more vehicle states, for example a gear selection, passenger occupancy, a headlight activation, etc.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but are not limited to signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

What is claimed is:

1. A display system for a vehicle comprising:
   a display device disposed in a passenger compartment of the vehicle, the display device comprising a screen;

a proximity sensor comprising a first directional control comprising a linear array of lateral sensors extending in a first direction along a first side of the screen and a second directional control comprising a linear array of vertical sensors extending in a second direction along a second side of the screen, wherein the first directional control and the second directional control are disposed behind a bezel and outside the perimeter of the screen; and a controller in communication with the display device and an imager configured to capture image data in a field of view, wherein the controller is operable to adjust at least one of a position and a scale of a desired view of the image data for display on the screen in response to an input received by the proximity sensor indicating a movement of an object proximate to the screen along at least one of the first direction and the second direction, and wherein the controller is configured to identify a gesture of the object proximate the proximity sensor based on a detection signal from the linear array of lateral sensors and the linear array of vertical sensors.

2. The display system according to claim 1, wherein the first direction is substantially perpendicular to the second direction.

3. The display system according to claim 1, wherein the first directional control is configured to detect a relative location of the object along the first side and the second directional control is configured to detect a relative position of the object along the second side.

4. A display apparatus for a vehicle comprising:
a display device disposed in a passenger compartment of the vehicle, the display device comprising a screen;
a first linear array of sensors disposed along a first perimeter edge of the screen and configured to detect a first movement of an object along the first perimeter edge proximate to the screen in a first direction;
a second linear array of sensors disposed along a second perimeter edge of the screen and configured to detect a second movement of the object along the second perimeter edge proximate to the screen in a second direction; and
a controller in communication with the display device and an imager configured to capture image data in a field of view, wherein the controller is operable to adjust at least one of a position and a scale of a desired view of the image data for display on the screen in response to a detected movement of the object along the first perimeter edge and the second perimeter edge, where the controller is further configured to identify a gesture of the object in response to the first movement along the first perimeter edge in combination with the second movement along the second perimeter edge proximate to the screen.

5. The display apparatus according to claim 4, wherein the first direction and the second direction are substantially perpendicular.

6. The display apparatus according to claim 4, wherein each sensor of the linear sensor arrays is substantially evenly spaced in the first direction and the second direction.

7. The display apparatus according to claim 4, wherein the first direction extends substantially horizontal along the front surface of the display device and the second direction extends substantially vertical along the front surface of the display device.

8. The display system according to claim 4, wherein the first linear array and the second linear array are concealed behind a bezel of the display device, the bezel extending around a perimeter of a front surface of the display device.

9. A display device for a vehicle comprising:
a display screen coupled to a rearview display housing disposed in a passenger compartment of the vehicle;
a bezel disposed around a perimeter of the display screen;
a first linear array of sensors disposed behind the bezel along a first side of the display screen and outside a perimeter of the display screen extending in a first direction;
a second linear array of sensors disposed behind the bezel along a second side of the display screen and outside the perimeter of the display screen extending in a second direction, wherein the first direction is substantially perpendicular to the second direction; and
a controller in communication with the display screen and an imager configured to capture image data in a field of view, wherein the controller is configured to:
detect a motion of an object along the first side and the second side based on communications from the first linear array of sensors and the second linear array of sensors; and
adjust a position of a desired view of the image data for display on the display screen in response to a change in the position of the object along the first side and the second side.

* * * * *